(12) United States Patent
Arcaini et al.

(10) Patent No.: US 7,663,474 B1
(45) Date of Patent: Feb. 16, 2010

(54) METHOD AND APPARATUS FOR AUTOMATIC NONINVASIVE ILLEGAL RIDER DETECTION SYSTEM

(76) Inventors: Gianni Arcaini, 6622 Southpoint Dr. South, Suite 310, Jacksonville, FL (US) 32216; Aydin Arpa, 6622 Southpoint Dr. South, Suite 310, Jacksonville, FL (US) 32216; Scott Carns, 6622 Southpoint Dr. South, Suite 310, Jacksonville, FL (US) 32216; Larry Strach, 6622 Southpoint Dr. South, Jacksonville, FL (US) 32216

( * ) Notice: Subject to any disclaimer, the term of this patent is extended or adjusted under 35 U.S.C. 154(b) by 296 days.

(21) Appl. No.: 11/758,709

(22) Filed: Jun. 6, 2007

(51) Int. Cl.
*G08B 21/00* (2006.01)
*G08G 1/01* (2006.01)
*G08B 1/08* (2006.01)
*G06F 15/18* (2006.01)
*G06K 9/00* (2006.01)

(52) U.S. Cl. .................... 340/431; 340/933; 340/937; 340/539.1; 706/2; 382/181; 382/182; 382/190; 348/143

(58) Field of Classification Search .................. None
See application file for complete search history.

(56) References Cited

U.S. PATENT DOCUMENTS

| 5,304,849 | A | 4/1994 | Chen et al. |
| 5,369,269 | A | 11/1994 | Fukuda et al. |
| 5,404,128 | A | 4/1995 | Ogino et al. |
| 5,444,430 | A | 8/1995 | McShane |
| 5,703,368 | A | 12/1997 | Tomooka et al. |
| 5,866,811 | A | 2/1999 | Skantar |
| 5,920,057 | A | 7/1999 | Sonderegger et al. |
| 6,337,629 | B1 | 1/2002 | Bader |
| 6,401,207 | B1 | 6/2002 | Funakoshi et al. |
| 6,542,076 | B1 | 4/2003 | Joao |
| 7,120,482 | B2 | 10/2006 | Kimura |
| 7,139,411 | B2 | 11/2006 | Fujimura et al. |

FOREIGN PATENT DOCUMENTS

JP 2002245498 A * 8/2009

* cited by examiner

*Primary Examiner*—Julie Lieu
(74) *Attorney, Agent, or Firm*—Lawrence J. Gibney, Jr.

(57) ABSTRACT

This is a method and apparatus for the detection of a noninvasive method by which illegal riders can be detected. This will save tremendous amounts of time and money with regard to the inspection of individual trains and also minimize the necessity of randomly stopping a train and randomly inspecting cars on the train.

4 Claims, 2 Drawing Sheets

METHOD AND APPARATUS FOR AUTOMATIC NONINVASIVE ILLEGAL RIDER DETECTION SYSTEM

REFERENCE TO RELATED APPLICATIONS

The same inventors have filed an application that describes automatic noninvasive container breach detection systems using visual cues and a separate application that detects container breaches using RFID tags. These applications have the following respective titles and application numbers: Method and Apparatus for Automatic Non-Invasive Container Breach Detection System using visual cues, application Ser. No. 11/755,959, and Method and Apparatus for Automatic Non-Invasive Container Breach Detection System using RFID tags, application Ser. No. 11/755,038.

BACKGROUND OF THE INVENTION

A. Field of the Invention

This method and apparatus relates to providing an early warning system to detect the presence of illegal riders on trains and employs many of the same features that are found in the previously referenced applications. This type of technology is particularly suited to the railroad industry but can have other applications as well.

Often times, illegal riders will board trains to travel from place to place and particularly across borders. It is, however, cost prohibitive to stop every train and inspect every rail car. This system greatly reduces the cost and maximizes the efficiency of a type of early warning system to detect illegal riders thus minimizing the stoppage of entire trains with the attendant costs of delay and provides a readable format at a remote facility.

B. Prior Art

Many other prior art references exist which deal with security systems and in particular container security systems. Some of these container security systems employ radio frequency identification tags, RFID tags.

A representative example in the prior art that teaches container security can be found at Easley, U.S. Pat. No. 7,094,784. Easley teaches a system that monitors the contents of the interior of the container using electronic means to transmit this information to a remote facility. Another example can be found at Stratmoen U.S. Pat. No. 7,002,472 which teaches a smart and secure container. The container has a means to access the cargo and certain predetermined factors are selected that when violated would determine a possible breach to the container. The information about the breach is then forwarded to a central data collection station.

The use of RFID tags to monitor activity is found in the prior art and examples of patents that teach this technology include Nowak, U.S. Pat. No. 7,123,149 and Hornbacker, U.S. Pat. No. 7,047,103.

A system that teaches the tracking of goods through a variety of tracking stations can be found at Clift, U.S. Pat. No. 7,126,470. Clift, however, is an inventory control system and does not specifically address the issue of container breach or the detection of illegal riders.

There are other systems in the prior art that teach article tracking methods and systems including real time tracking of goods and examples of this type of device and method can be found at Chung, U.S. Pat. No. 7,036,729 and Li, U.S. Pat. No. 7,136,832. Both the Chung and Li patents use RFID technology in the tracking methods.

None of the prior art references teach a system that combines technology that detects the presence of a container breach or the presence of an illegal rider in one system that provides a panoramic view of the information such that the exact location of a breach or an illegal rider can be pinpointed.

BRIEF SUMMARY OF THE INVENTION

This is a system that will provide noninvasive inspection of a train or other moving object from a fixed position. It will facilitate the detection of illegal train riders. This particular problems cost the train industry millions of dollars because the entire train needs to be stopped as an inspection is conducted.

In the normal course of events to inspect for illegal riders the train is physically stopped and random spot inspections of the train and its cars are performed. On a train with hundreds of containers or cars, this method of inspection proves to be daunting, very inexact and extremely inefficient. One of the difficulties is pinpointing the exact location of a problem, particularly on a train with multiple containers and other cars.

Illegal Rider

In addition to the cost of performing container searches illegal riders are a major economic and political problem particularly along the Mexico-United States border and cost taxpayers, in addition to the train industry, millions of dollars trying to prevent or stem the tide of the flow of illegal immigrants.

This method addresses this problem by avoiding the complete stoppage of the train for an inspection. This is done through a device and method to detect the presence of an illegal rider as well as gathering information to detect the presence and exact location of a container breach that has been described in the related applications. Any evidence that may be gathered can be archived for later use and for law enforcement purposes.

The exact methodology that will be employed to detect a container breach will not be discussed in detail in this application as those methods have been previously discussed in the prior filed applications. The same technology will be used, however, to detect the presence of a human person on a train.

This method and apparatus will operate regardless of the number of containers or cars on a given train, the speed of the train or the length of the train.

All trains pass through portals, which are large trusses onto which cameras are mounted. These cameras will view the container from many different angles and are designed to operate in low or dim lighting situations.

Certain predetermined parameters have been installed in software which will detect the presence of human body parts such as an arm or leg. When a human body part is captured by the camera and integrated into the software, the information will be relayed to a remote facility for viewing. The software will indicate the exact location of the human on the train thus making the job of location greatly simplified.

DETAILED DESCRIPTION OF THE EMBODIMENTS

Prior to departure from a given location a container or car is loaded and secured on a train rail car 3. This may be a single container or the containers may be stacked one on top of each other. The container, however, does not occupy the entire space on the flat car 3. A human person 4 can easily step onto the flat car 3 without detection because of the sheer numbers of container or other cars on a given train.

Cameras 1 are used at the portals 2 to capture a series of images of the train including the presence of a human person 4. Multiple cameras may be used to obtain the maximum amount of coverage for the cameras. The cameras should operate in periods of dim or low lighting 1B and should also have infrared 1A capability.

One of the salient features of this system is the detection of illegal riders. Software 8 is integrated into the system that has predetermined shapes or templates for different human parts as well as for the basic structure of a train and the likely cargo that is carried on a train.

Figure 1:
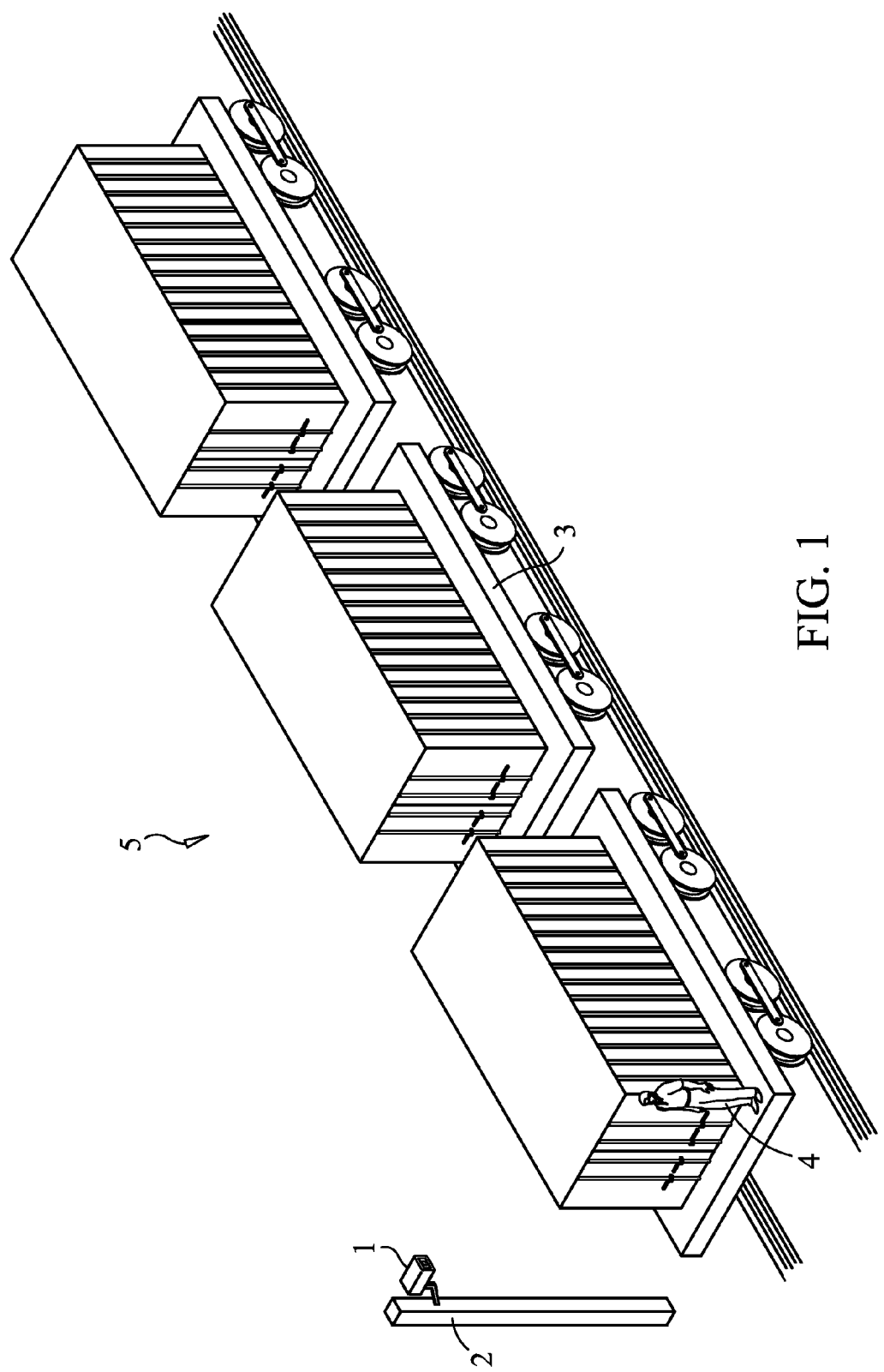
FIG. 1 is an isometric view of a portion of the train.
Figure 2:
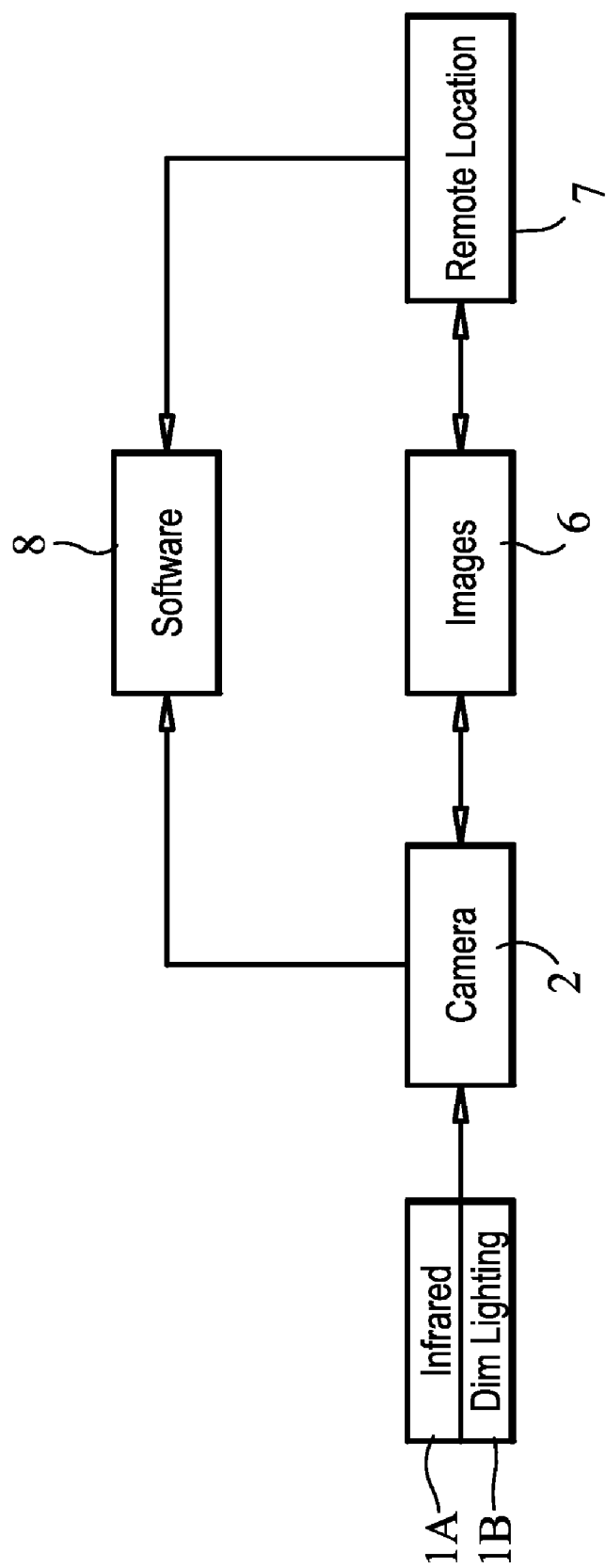
FIG. 2 is a schematic of the components of the system.

Trains have essentially rectangle, square or cubic shapes with defined sides, tops and bottoms. Much of the cargo on trains is carried in containers, which are cubic structures with defined sides, top and bottoms such as depicted in FIG. 1. Humans, on the other hand, have very few, if any, straight lines. Curves are predominate on the human body and the human body does not have defined sides, tops or bottoms.

As the train moves through the checkpoint or portal 2 a camera 1 or more likely a plurality of cameras, which are mounted to the portal 2 capture an image of the entire train. The software will detect the general physical structure of any objects on the train. If the structure appears cubic the software does not alert the operator of any problem. However, if the presence of curves is detected according to preset parameters within the software, it will alert the operator of a possible illegal rider.

In order to be usable the images 6 from the cameras is sent to a remote facility 7 for possible corrective action.

One of the challenges in any security system is capturing the images and integrating them into a temporal image that can be viewed and analyzed in real time. This is particularly true with a moving object such as a train, which is moving rapidly through a checkpoint or portal at speeds in excess of sixty miles per hour. The proper placement of a camera or a plurality of cameras by themselves at various portals or checkpoints will capture the video images but will not integrate the data into a readable form at a remote facility. In the situation where the detection of illegal riders or container breaches is sought, it is more useful to have one image per rail car for any given train.

The camera images are integrated into a computer vision technique like the Lucas Kanade optical flow in which a linear panorama of the moving object can be created and then forwarded to a remote facility. This linear panorama technique will allow the operator to view the entire train, not just a specific car or the specific image that is captured by the camera.

Color or thermal cameras can be installed on a portal or truss with various angles to minimize the occlusions and maximize physical coverage so that an illegal rider will be visible in any configuration except being in a container. These particular views can be fused together by using two live feeds in order to enhance the visual information.

Once it has been determined that an illegal rider or a breach has been identified, there is now a need to locate the exact position of the incident for law enforcement purposes.

Techniques that are used in the Lucas Kanade optical flow system can be used to identify specific locations. The information is presented for the screener at a remote facility in a readable form so that the appropriate correction can be made or action can be taken. The view will show the operator the exact location of the container breach or the exact location of the illegal rider in real time. The feature of displaying the images in real time is critical because of the mobility of the human person and his or her ability to quickly change their position on a train.

The inventors claim:

1. An apparatus for automatic noninvasive illegal rider system detection, which is comprised of:
   a. a train;
   wherein said train is comprised of a plurality of containers on a plurality of flat cars;
   wherein said plurality of flat cars are used to secure said containers on the train;
   said containers are smaller than the area of the area of said flat car;
   b. a plurality of portals;
   wherein said portals are placed along the route of the rail line;
   said portals are stationary;
   each of said portals is placed at a predetermined location along the rail line;
   c. a plurality of cameras;
   wherein each of said plurality of cameras is secured to each of said plurality of portals;
   wherein each of said plurality of cameras is used to capture images of said train;
   said plurality of cameras capture images of the containers and said flat cars of said train;
   d. a software;
   wherein said software integrates said captured images from said plurality of cameras;
   said software places the images from the plurality of cameras into a linear panorama;
   said software has predetermined templates to discriminate between the shape of containers and the shape of a human person and said software permits the detection of a human person at a specific location;
   e. a remote facility
   wherein said software transmits the information to said remote facility only when a human person is detected by said shape discrimination;
   wherein the information concerning the presence of a human person on the train is provided at said remote facility; and
   wherein a visual image of the human person on the train which is detected by said software is provided at said remote facility by the software.

2. The apparatus as described in claim 1 wherein the camera operates in low lighting.

3. The apparatus as described in claim 1 wherein the camera is equipped with infrared capability.

4. The apparatus as in claim 1 wherein the camera is a color camera.

* * * * *